(12) United States Patent
Selwan (10) Patent No.: US 6,172,538 B1
(45) Date of Patent: Jan. 9, 2001

(54) UNIVERSAL PULSE SYNCHRONIZER

(75) Inventor: Pierre M. Selwan, Fremont, CA (US)

(73) Assignee: Chips & Technologies, L.L.C., San Jose, CA (US)

( * ) Notice: Under 35 U.S.C. 154(b), the term of this patent shall be extended for 0 days.

(21) Appl. No.: 09/226,924

(22) Filed: Jan. 6, 1999

(51) Int. Cl.[7] ....................................................... H03L 7/00
(52) U.S. Cl. ............................................. 327/141; 327/160
(58) Field of Search ..................................... 327/141, 151; 377/39, 55, 56, 66, 72, 73, 78, 80, 81, 104

(56) References Cited

U.S. PATENT DOCUMENTS

| | | | |
|---|---|---|---|
| 3,585,606 | 6/1971 | Evans et al. | 340/172.5 |
| 3,593,334 | 7/1971 | Bickel | 340/174.1 H |
| 4,021,607 | 5/1977 | Amano | 358/230 |
| 4,049,953 | 9/1977 | Evans, Jr. | 235/150.3 |
| 4,782,468 | 11/1988 | Jones et al. | 365/229 |
| 4,954,987 | 9/1990 | Auvinen et al. | 365/189.02 |
| 5,461,345 * | 10/1995 | Taki | 331/1 A |
| 5,508,679 * | 4/1996 | McClure | 340/146.2 |
| 5,661,425 * | 8/1997 | Minoda et al. | 327/159 |
| 5,790,891 * | 8/1998 | Solt et al. | 395/854 |
| 5,818,886 * | 10/1998 | Castle | 375/354 |

\* cited by examiner

Primary Examiner—My-Trang Nuton
(74) Attorney, Agent, or Firm—D'Alessandro & Ritchie (57) ABSTRACT

A method and an apparatus for reading a given digital pulse signal of variable length in the domain of a first clock frequency and creating a pulse output signal that is synchronized in the domain of a second clock. The number of cycles the input pulse signal is active, in terms of the first clock, is the same number of cycles as the resulting output signal is active, where for the output signal the number of cycles is measured by the second clock.

19 Claims, 4 Drawing Sheets

UNIVERSAL PULSE SYNCHRONIZER

BACKGROUND OF THE INVENTION

1. Field of the Invention

The present invention relates to the timing of digital signals on an integrated circuit. More particularly, the present invention is directed to a method and an apparatus for synchronizing a signal with respect to two independent clocks.

2. The Background Art

The use of clocking systems is well known in the field of integrated circuits. Clock signals are used in synchronous circuits to direct elements of the circuit when to transition from the "current state" to the "next state." For example, determining when a particular register should sample or store input data. A clock literally sets the pace of, and provides the unit of measure for, the various stages of computations and operations on a chip. A clock signal normally transitions between a low and a high state, denoted 0 and 1 respectively, at a speed determined by the cycle time of the particular clock. Typically, it is the clock signal transition, either rising (rising edge) from 0 to 1 or falling (falling edge) from 1 to 0, that is used to pace the chip operations. In some situations both the clock signal transition and it's complement (the rising and falling edges) are used. A common operation in the field of integrated circuits is measuring how long a given signal is active, e.g., in the 1 state, as measured by the number of cycles of the clock.

In many applications, there are multiple clock signals on the same chip. Often there is a direct relationship between the multiple clock signals. Examples include: two clocks operating at the same frequency but out of phase and one clock operating at a frequency that is an integer multiple of another. Where the mathematical relationship between the clocks is known, transforming a signal from one clock domain to the other is relatively straightforward. This is not so when two clocks signals are not correlated, or when the relationship between them is unknown.

It would be desirable (for example in the field of video displays) to have an efficient way of converting an input pulse signal of a variable length X cycles, in terms of a first clock, into a pulse output signal, X cycles long in terms of a second clock, where the two clocks are operating at different frequencies. That is, to efficiently synchronize the input pulse signal across the two independent clock domains.

Figure 1:
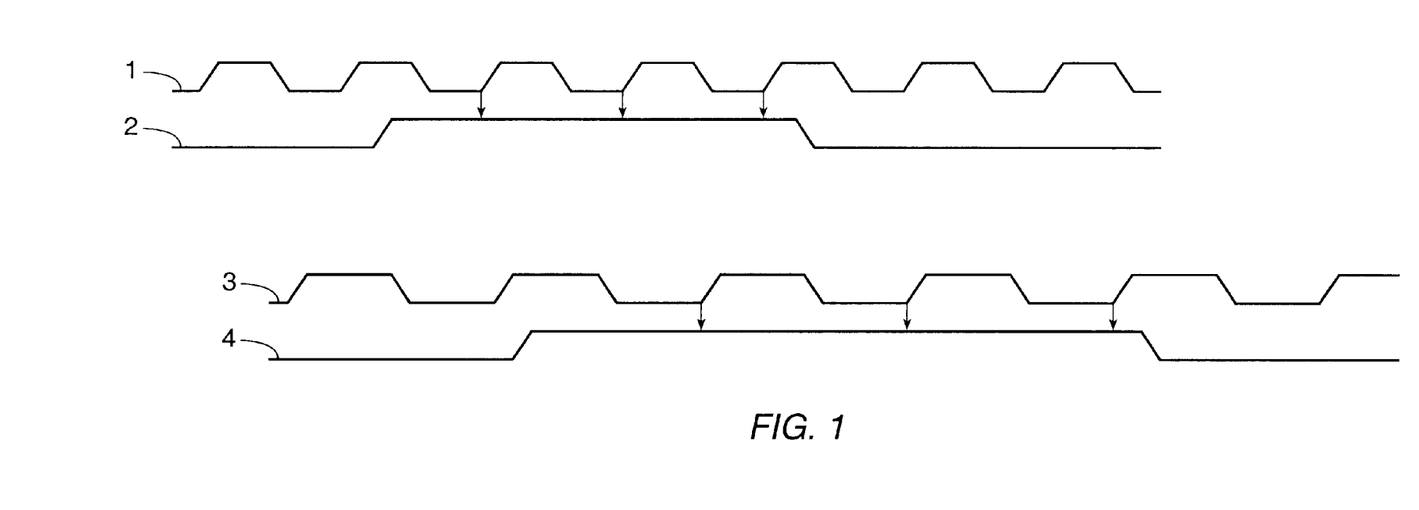
FIG. 1 is a timing diagram showing an example of a three clock cycle long input pulse and a synchronized output signal generated from it, shown with both clock signals.

FIG. 1 shows a first clock signal 1 and an input pulse signal 2, which is three clock cycles long. The second clock signal 3 is slower than the first, it operates at a lower frequency. Thus, the synchronized output signal 4 is stretched, compared to the input pulse signal, in order to also be three clock cycles long, as measured by the second clock. The timing of samples in FIG. 1 are based on the rising edges of the clock signals. The falling edges could just as well have been used. There is no attempt made to resolve the input pulse signal any finer than an integer clock cycle, at both the beginning and the end of the signal.

Figure 2:
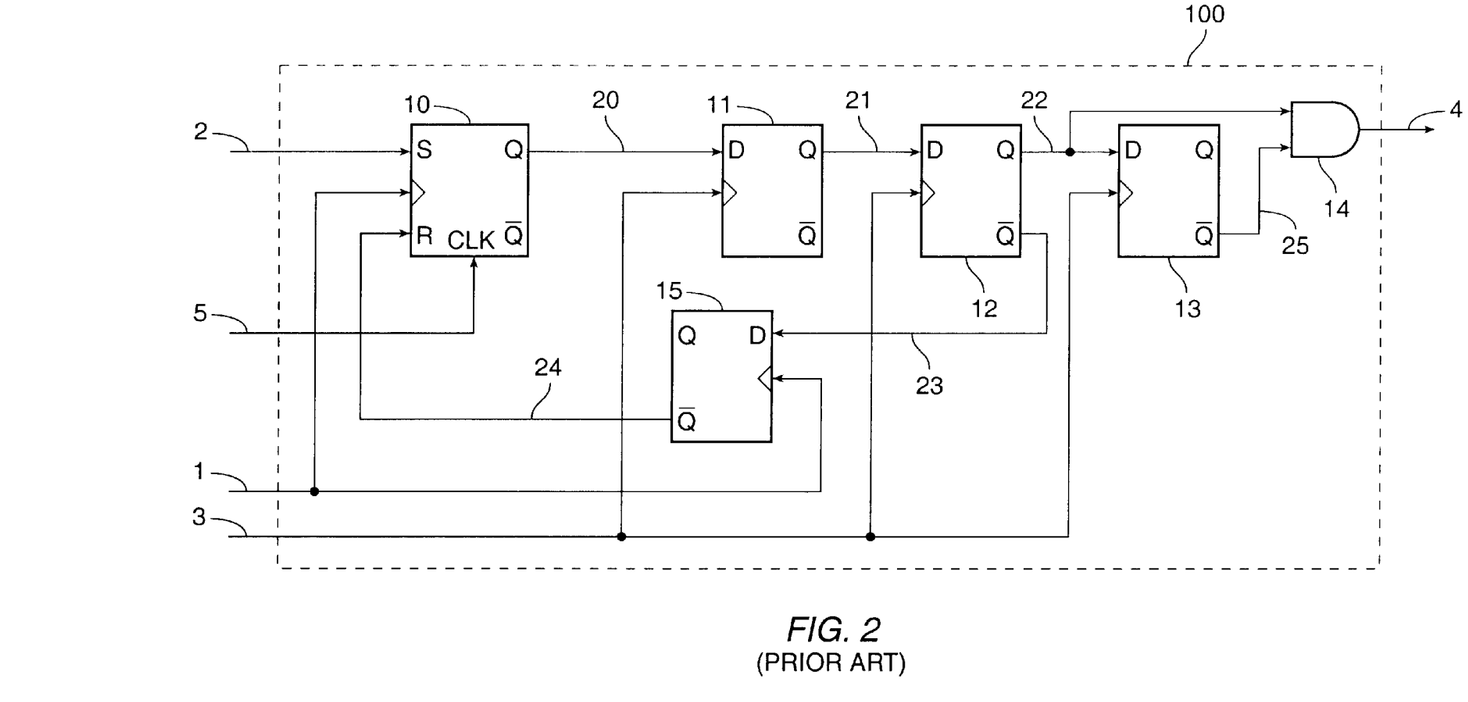
FIG. 2 is an electrical schematic diagram depicting a circuit for creating a synchronized output signal, in accordance with the prior art.

As shown in FIG. 2, it is possible to use a circuit such as circuit 100, made up primarily of latches, to synchronize an input pulse with a pulse output signal. The input pulse signal 2 is latched by latching mechanism 10 when the first clock signal is active. Latching mechanism 10 operates as a filter for the input pulse signal. This latched signal is an output signal 20, that is latched by latching mechanism 11, on the rising edge of the second clock and output as signal 21.

There is a possibility that signal 21 may be metastable, that is in an indeterminate state between 0 and 1 because the latching mechanism 11 is perfectly balanced between making a decision to resolve a 0 or a 1. The possibility that signal 21 maybe metastable depends on how the rising edges of the asynchronous clocks happen to line up, and this alignment could be changing with each clock cycle. To ensure a stable signal, a third latching mechanism 12 is used. Latching mechanism 12 reads signal 21, on the rising edge of the second clock signal 3. The latched signal from latching mechanism 12 is then output as signal 22, both to latching mechanism 13 and to AND gate 14. The complement of the latched signal from latching mechanism 12 is output as signal 23 to latching mechanism 15. Latching mechanism 13 operates as an integrator, it reads signal 22 on the rising edge of the second clock signal 3 and outputs the complement of the latched signal as signal 25 to AND gate 14. Latching mechanism 15 reads signal 23 on the rising edge of the first clock signal 1 and outputs the complement of that signal as signal 24. When signal 24 is high, latching mechanism 10 is reset. Signal 4, coming out of AND gate 14, is the synchronized output signal.

One disadvantage of the circuit shown in FIG. 2 is that this implementation introduces a recovery time. Time is required between sequential input pulse signals because the circuit must be idle before another input pulse can be processed. The circuit in FIG. 2 would require resetting the latch mechanisms 10 and 13 to the "0" state. This corresponds to a minimum recovery time equal to 2 cycles of clock 1 plus 3 cycles of clock 2. It would be desirable to minimize or eliminate the recovery time for time critical or real time applications, so that another input pulse signal could be quickly processed. Introducing a delay between sequential input pulse signals solves the problem, but does so at the expense of speed. In addition, this solution requires different minimum delay times for different clock combinations.

Another related problem with the type of circuit shown in FIG. 2 is that the implementation requires a series of latches, latching the input pulse signal on both the clock signals, to avoid metastable or transitional states in the circuit components. This series of latches introduces delays. It is well known to those of ordinary skill in the art that such metastable states may lead to erroneous output results and that these states are not always easily detected by logic simulators and other conventional design techniques. It would be desirable to have a proven generic design for use in all signal synchronization situations, that avoids the use of devices having potential metastable states.

SUMMARY OF THE INVENTION

A method and an apparatus for creating an output signal in a second clock domain that is synchronized with a given input pulse signal from a first clock domain. A digital input pulse signal is read and the length of time in clock cycles of the first clock domain (it must be active for at least one clock cycle) that it is active is measured. An output signal is active for the same number of (first) clock cycles, as measured in cycles of a second clock. There does not need to be any correlation between the two clocks. A second input signal may be read immediately after creating the first output signal. Two unit code counters are used to count the number of cycles of the clocks. This counting, as well as the process of creating the output signal, begins immediately upon the reading of an active input pulse symbol. The unit code counters increment by changing only one bit between successive values. Unlike latches, unit code counters do not go through transitional states. Metastability is thus avoided.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons after an examination of the within disclosure.

Figure 3:
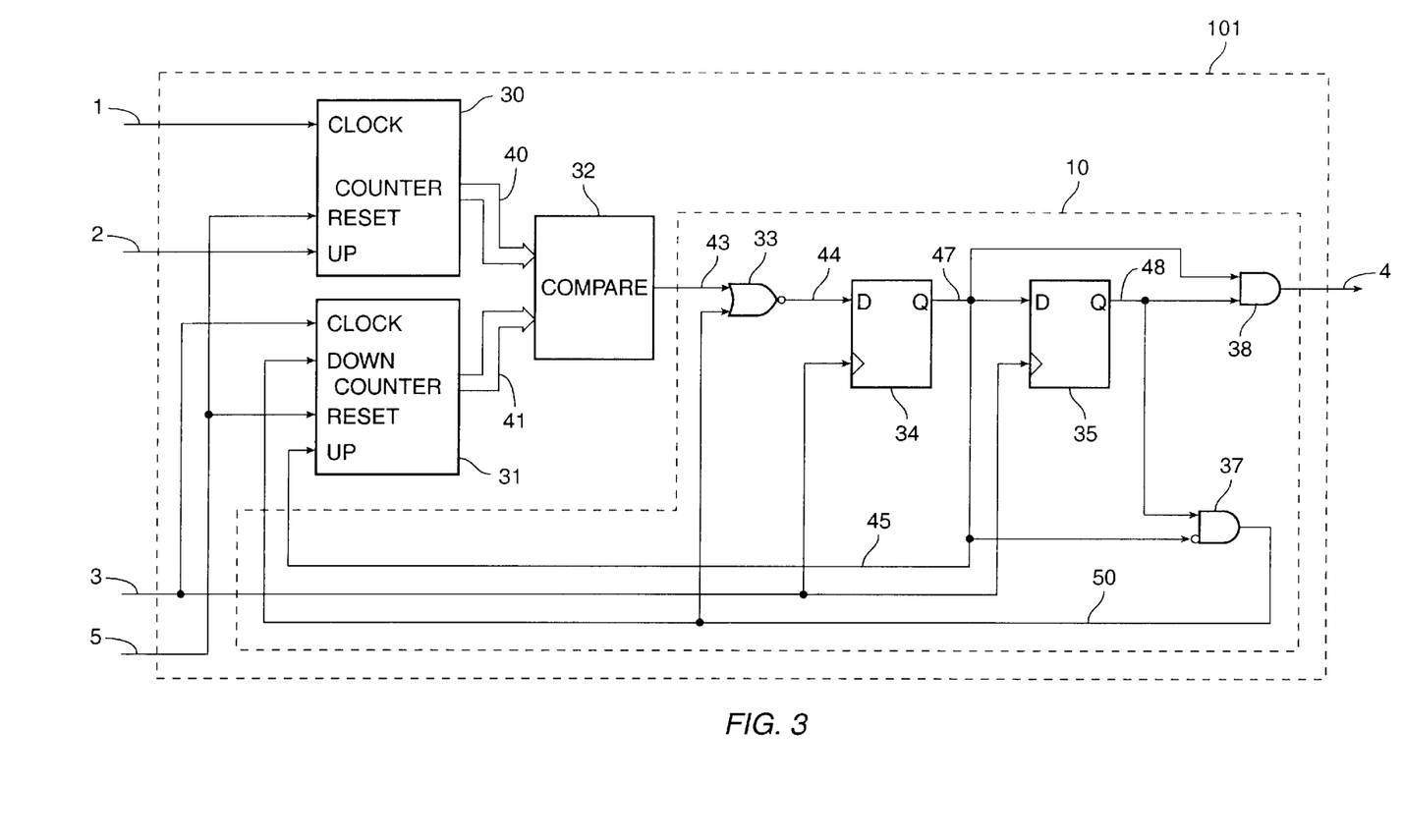
FIG. 3 is an electrical schematic diagram depicting a first presently preferred embodiment of the present invention for the general case, for use with any clock speed or circuit elements.

FIG. 3 is an electrical schematic diagram depicting a first presently preferred embodiment of the present invention. This embodiment is ideal for the most general case, useable with any clock speed or circuit elements. The process and components that make up circuit 101 read input signals 1, 2, 3 from FIG. 1 and optionally a reset signal 5 to produce the synchronized output signal 4. The first clock signal 1 is an input to the first counter 30 for use in latching input pulse signal 2. The input pulse signal 2 is read by counter 30, on the rising edge of the first clock signal 1. If the input pulse signal 2 is active, counter 30 is incremented by one unit. The value of counter 30 is then output as signal 40, which is one of the two input values to comparator 32.

The second clock signal 3 is an input to, and used for latching the input data signals of the second counter 31, the first latching mechanism 34 and the second latching mechanism 35. Counter 31 reads signals 45 and 50 on the rising edge of the second clock signal 3. If signal 45 is active, counter 31 is incremented by one unit. If signal 50 is active, counter 31 is decremented by one unit. The value of counter 31 is then output as signal 41, which is the other input value to comparator 32.

The comparator is a logic device that accepts as input two values, such as the count values from counters 30 and 32, checks to see if the two values match and creates as output compare signal 43. If there is a match, then compare signal 43 is set active. If the input values do not match, compare signal 43 is inactive. The comparator is sized such that the inputs can be as large as the largest count values generated by the counters, while the output can be a single bit.

Comparator 32 compares the values from 40 and 41 and creates compare signal 43. Signal 43 is read by NOR gate 33, along with signal 50. The result of NOR gate 33, output as signal 44, is the data input to latching mechanism 34, which is read on the rising edge of the second clock signal 3. Latching mechanism 34 sends the latched signal as an output signal 47 to four devices: AND gate 38, data input to latching mechanism 35, AND gate 37 and to counter 31 as signal 45. Signal 45 is available to counter 31, to increment the count. Signal 45 is evaluated by counter 31 on the rising edge of the second clock signal 3.

Latching mechanism 35 reads data signal 47 on the rising edge of the second clock signal 3, the latched signal is then output as signal 48 to two devices: the second signal for AND gate 38 and the second signal for AND gate 37. The output of AND gate 37, signal 50, is then used as a feedback for input to both NOR gate 33 and counter 31, where it is available to decrement the counter. Signal 50 is evaluated by counter 31 on the rising edge of the second clock signal 3.

The output of AND gate 38 is the synchronized output signal 4.

Figure 4:
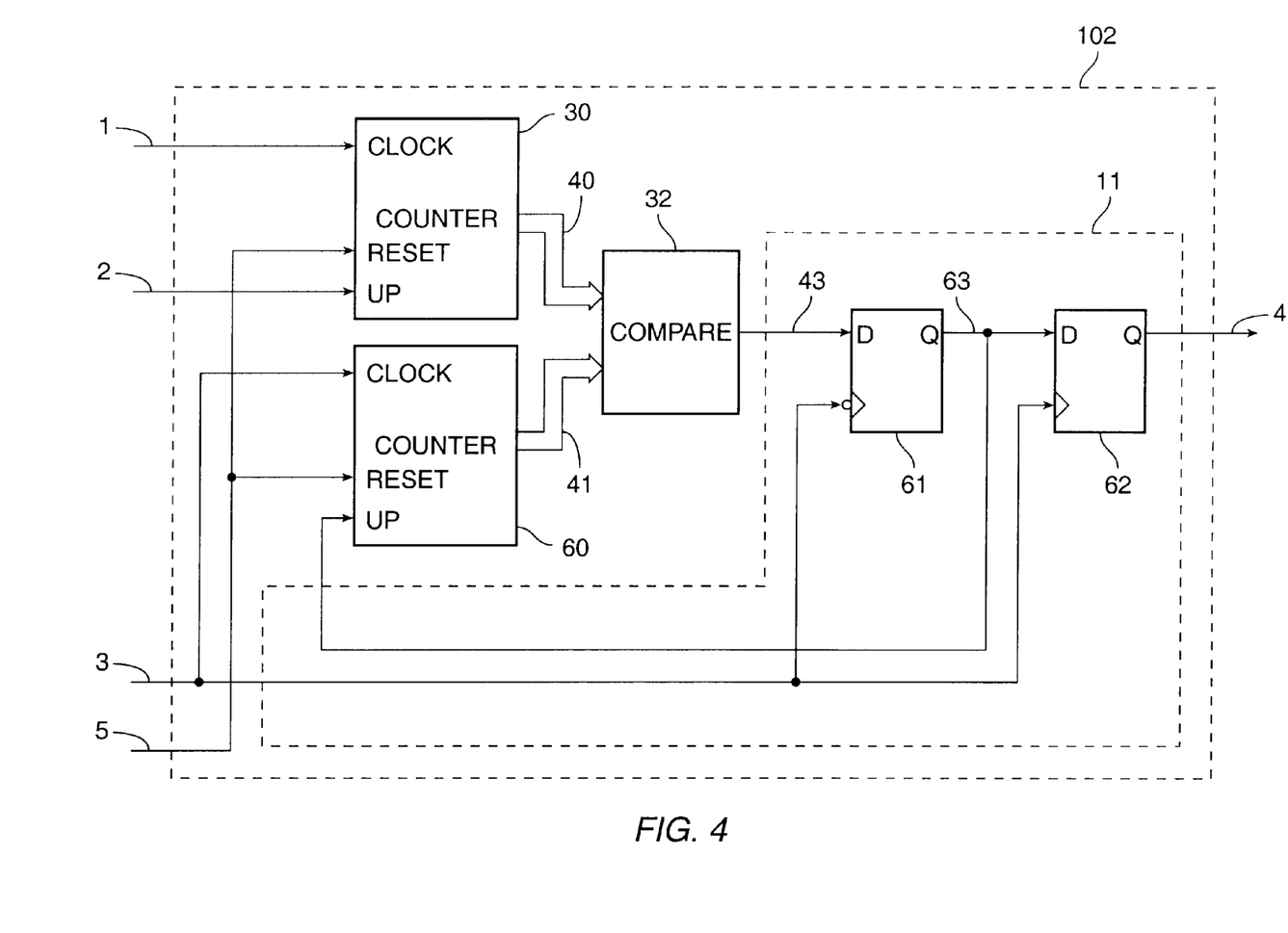
FIG. 4 is an electrical schematic diagram depicting a second presently preferred embodiment of the present invention where the count and compare circuit elements are fast in comparison to the second clock signal.

The components that make up circuit 10 constitute a driver for generating output signal 4 with inputs of only compare signal 43 and the second clock signal 3. Driver 10 also creates signals 45 and 50 as output, for use in incrementing and decrementing the second counter. FIG. 3 shows a presently preferred embodiment of driver 10, other functionally equivalent arrangements of components for the driver would be apparent to those of ordinary skill in the art FIG. 4 shows a second presently preferred embodiment of the present invention, where the count and compare circuit elements are fast in comparison to the second clock signal. The circuit 102 shown in FIG. 4 uses the rising edge of the second clock signal 3 to latch the data at the second counter 60 and the falling edge of the same clock signal for latching the data of latching mechanism 61. The procedure depicted requires that: counters 30 and 60 produce counts 40 and 41, they are read by compare unit 32 and the output signal 43 is property set within one-half of a cycle of the second clock signal 3. If the falling edge of clock signal 3 "loses the race" with signal 43, either because the second clock is too fast or because the counters and comparator path is too slow, this method of producing a synchronized output signal fails.

The process and components that make up circuit 102 read as input signals 1, 2, 3 (from FIG. 1) and optionally reset signal 5 to produce the synchronized output signal 4. The first clock signal 1 is an input to the first counter 30 for use in latching input pulse signal 2. The input pulse signal 2 is read by counter 30, on the rising edge of the first clock signal 1. If the input pulse signal 2 is active, counter 30 is incremented by one unit. The value of counter 30 is then output as signal 40, which is one of the two input values to comparator 32.

The second clock signal 3 is an input to, and used for latching the input data signals of the second counter 60 and the latching mechanism 62. The complement of the second clock signal 3, the falling edge, is used to latch the input data signal of latching mechanism 61. Counter 60 reads signal 63 on the rising edge of the second clock signal 3. If signal 63 is active, counter 60 is incremented by one unit. The value of counter 60 is then output as signal 41, which is the other input value to comparator 32.

Comparator 32 compares the values from 40 and 41 and creates compare signal 43. Signal 43 is read by latching mechanism 61 on the falling edge of the second clock signal 3, the latched signal is output as signal 63. Signal 63 is both fed back to counter 60 and used as a data input to latching mechanism 62. Counter 60 latches signal 63 on the rising edge of the second clock signal 3 and increments the counter by one unit when signal 63 is active. Latching mechanism 62 latches signal 63 on the rising edge of the second clock signal 3, the latched signal is the synchronized output signal 4.

The components that make up circuit 11 constitute a driver for generating output signal 4 with inputs of only compare signal 43 and the second clock signal 3. Driver 11 also creates signal 63 as output, for use in incrementing the second counter. FIG. 4 shows a presently preferred embodiment of driver 11; other functionally equivalent arrangements of components would be apparent to those of ordinary skill in the art Counters 30, 31 and 60, shown in FIGS. 3–4 are devices capable of incrementing, and in the case of counter 30 decrementing, one unit code value at a time when an input pulse signal is active and latched according to the timing of a clock signal. The current unit code value is then output. In accordance with a presently preferred embodiment of the present invention, the rising edge of the clock signal is used to latch the input pulse signal preferably. The counters may accept a reset signal 5 to set the counters to some initial value at start up. Resetting the counters between successive input pulse signals is not considered necessary.

Any consistent set of unit code values could be used for the counters, so long as both counters used the same set of values and the individual values did not repeat during the processing of a single input pulse signal. The number of bits used for the counter value is chosen so that the individual values do not repeat when processing the longest anticipated input pulse signal, with the fastest first clock signal anticipated and the slowest second signal anticipated. Comparator 32, and the data paths 40 and 41 must be sized to handle the largest unit code values. Unit codes have the property that only a single bit changes from one value to the next. Thus, the values do not go through transitional states before settling on the next count. In accordance with a presently preferred embodiment of the present invention, Gray codes, a particular set of unit codes that are relatively easy to implement at the bit level are used. Three bit Gray code values for a set of decimal values is shown in Table 1. Gray codes of any bit length can be created from a binary number sequence by the following two step procedure. First, place a leading zero before the most significant bit in the binary number sequence. Second, a logical exclusive-or (XOR) operation is performed on each adjacent pair of bits starting from the left, the result is the Gray code equivalent of the binary number. This sequential XOR operation has been applied to the third column of Table 1 to generate the gray codes column four.

TABLE 1

| Decimal Value | Three Bit Binary Representation | Leading Zero Added | Three Bit Gray code |
|---|---|---|---|
| | | Gray Codes | |
| 0 | 000 | 0000 | 000 |
| 1 | 001 | 0001 | 001 |
| 2 | 010 | 0010 | 011 |
| 3 | 011 | 0011 | 010 |
| 4 | 100 | 0100 | 110 |
| 5 | 101 | 0101 | 111 |
| 6 | 110 | 0110 | 101 |
| 7 | 111 | 0111 | 100 |

A look up may also be used to find successive unit code values. A look up table approach could store an array of sequential unit code values, such as those in the right column of Table 1, and advance through the array with each increment of the counter.

A first presently preferred embodiment of the present invention, as shown in FIG. 3, may be used in situations where the first clock is faster than, slower than or equal to the second clock speed. There is no limit on the relative clock speeds for this embodiment of the present invention, or any required relationships between the processing speed and clock speeds. Because of this versatility, and the fact that there is no minimum system recovery time, this embodiment of the present invention can be used in all applications requiring the synchronization of signals across two clock domains. The use of the present invention as a uniform and proven design would remove the need to custom design a method of signal synchronization for a particular set of clock speeds and minimizes the risks of having a circuit with difficult to trace metastable component states.

A second presently preferred embodiment of the present invention, as shown in FIG. 4, uses a simpler design, with fewer components than the first. However, with this second embodiment of the invention there is a restriction on the speed of the components relative to the speed of the clocks. The reading, counting and comparing steps must occur before the second clock completes one-half of a cycle. Thus, this simpler design is not a universal synchronization means; the maximum clock speeds that may be used with this second embodiment are limited by the speed of the circuit components used to implement the invention.

The present invention is capable of reading a second input immediately after creating the first output signal. There is no need for any circuit recovery time before reading another signal, as long as the first output signal has finished being created. This feature of the present invention allows higher throughput than the types of circuits shown in FIG. 2. There is also no need to reset any of the system components between successive input pulse signals. A set of embodiments of the invention does provide a means of resetting the counters. This feature is for initializing the circuit at start-up and its use is not required between input pulse signals.

While embodiments and applications of this invention have been shown and described, it would be apparent to those skilled in the art, after a perusal of this disclosure, that many more modifications than mentioned above are possible without departing from the inventive concepts herein. The invention, therefore, is not to be restricted except in the spirit of the appended claims.

What is claimed is:

1. A method of synchronizing a first signal from a first clock domain to form a second signal in a second clock domain, said method comprising:

measuring the length of the first signal in cycles of the first clock to determine an integer length value;

generating the second signal by forcing it active for a number of cycles of the second clock equal to said length value; and performing said measuring step immediately after completing said generating step using unit code counters or Gray codes.

2. A method according to claim 1 further comprising initializing the system before reading the first signal.

3. A method according to claim 1 wherein said measuring and generating steps are accomplished by a process unaffected by transitional states of the first and second clocks.

4. A method according to claim 1 wherein generating the second signal is performed within one-half of a cycle of the second clock.

5. An apparatus for synchronizing a first signal from a first clock domain to form a second signal in a second clock domain, said apparatus comprising:

a first counter clocked by the first clock for counting a first number of cycles of the first clock that the first signal is active, said first counter is a unit code counter or a Gray counter;

a second counter clocked by the second clock for counting a second number of cycles of the second clock that the first signal is active, said second counter is a unit code counter or a Gray counter;

a comparator for comparing said first number with said second number and providing a compare signal; and a driver responsive to said compare signal for generating the second signal for said second number of cycles of the second clock.

6. An apparatus according to claim 5 wherein said first counter and said second counter begin counting an additional first signal immediately after the initial second signal is formed.

7. An apparatus according to claim 5 wherein said first counter and said second counter accept a reset signal, as an additional input, that causes said first and second counts to match.

8. An apparatus according to claim 5 wherein said first and second counters do not go through transitional states while counting.

9. An apparatus according to claim 5 wherein said driver is capable of decrementing said second counter.

10. An apparatus according to claim 9 wherein said first counter and said second counter begin counting an additional first signal immediately after the initial second signal is formed.

11. An apparatus according to claim 9 wherein said first counter and said second counter begin counting without latching the first signal by the first and second clocks.

12. An apparatus according to claim 9 wherein said first counter and said second counter accept a reset signal, as an additional input, that causes said first and second counts to match.

13. An apparatus according to claim 5 wherein said compare signal is generated in less than one-half of a cycle of the second clock.

14. An apparatus according to claim 13 wherein said first counter and said second counter begin counting an additional first signal immediately after the initial second signal is formed.

15. An apparatus according to claim 13 wherein said first counter and said second counter begin counting without latching the first signal by the first and second clocks.

16. An apparatus according to claim 13 wherein said first counter and said second counter accept a reset signal, as an additional input, that causes said first and second counts to match.

17. An apparatus according to claim 13 wherein said first and second counters do not go through transitional states while counting.

18. An apparatus responsive to an input pulse signal, a first signal clock signal and a second clock signal for generating a synchronized output signal, wherein the input pulse signal is a certain number of first clock cycles long and the output signal is the same number of second clock cycles long, said apparatus comprising:

a first unit code counter having inputs from the first clock signal and the input pulse signal and having as an output a first counter, wherein said first unit code counter increments said first count when the input pulse signal is active, as evaluated during each cycle of the first clock signal;

a second unit code counter having inputs from the second clock, a first feedback loop and a second feedback loop and having as an output a second count, wherein said second unit code counter increments said second count when the signal from said first feedback loop is active, as evaluated during each cycle of the second clock signal, and said second unit code counter decrements said second count when the signal from said second feedback loop is active, as evaluated during each cycle of the second clock signal;

a comparator having as inputs said first count and said second count and having as an output a match signal, said comparator comparing said first count and said second count and generating said match signal which is set active when said first and second counts are equal and set inactive otherwise;

a first logic device having as inputs said match signal and said signal from said second feedback loop and having as an output a first logical comparison signal, wherein said first logic device compares said match signal and said signal from said second feedback loop and based thereon, generates said first logical comparison signal, said first logical comparison signal being set active if both input signals are inactive and set inactive if one or both of the input signals are active;

a first latching mechanism having as inputs said first logical comparison signal and the second clock signal and having as an output a first latched signal, wherein said first latching mechanism latches and evaluates said first logical comparison signal on each cycle of the second clock signal, said first latched signal being set equal to said first logical comparison signal as latched by the timing of the second clock signal;

a first feedback loop carrying said first latched signal to said second unit counter;

a second latching mechanism having as inputs said first latched signal and the second clock signal and having as an output a second latched signal, wherein said second latching mechanism latches and evaluates said first latched signal on each cycle of the second clock, said second latched signal being set equal to said first latched signal as evaluated by the timing of the second clock signal;

a second logic device having as inputs the inverse of said first latched signal and said second latched signal and as an output a second feedback loop signal, wherein said second logic device compares the inverse of said first latched signal and said second latched signal and, based thereon, generates a second feedback loop signal, said second feedback loop signal being set active if both the inverse of said first latched signal and said second latched signal are active and set inactive if one or both of the inverse of said first latched signal and said second latched signal are inactive, said second feedback loop signal being made available as an input to said second unit code counter unit and said first logic device; and a third logic device having as inputs said first latched signal and said second latched signal and as an output the synchronized output signal, wherein said third logic device compares said first latched signal and said second latched signal and, based thereon, generates the synchronized output signal, the synchronized output signal being set active if one or both said first latched signal and said second latched signal are active, the synchronized output signal being set inactive if both said first latched signal and said second latched signal are inactive.

19. An apparatus responsive to an input pulse signal, a first clock signal and a second clock signal for generating a synchronized output signal, wherein the input pulse signal is a certain number of first clock cycles long and the output signal is the same number of second clock cycles long, said apparatus comprising:

a first unit code counter having inputs from the first clock signal and the input pulse signal and having an output of a first count, wherein said first unit code counter increments said first count when the input pulse signal is active, as evaluated during each cycle of the first clock signal;

a second unit code counter having inputs from the second clock and a feedback loop and having an output of a second count, wherein said second unit code counter increments said second count when the signal from said first feedback loop is active, as evaluated during each cycle of the second clock signal, and said second unit code counter decrements said second count when the signal from said second feedback loop is active, as evaluated during each cycle of the second clock signal;

a comparator having as inputs said first count and said second count and having an output a match signal, said comparator comparing said first count and said second count and generating said match signal which is set active when said first and second counts are equal and set inactive otherwise;

a first latching mechanism having as inputs said match signal and the inverse of the second clock signal and having as an output a first latched signal, wherein said first latching mechanism latches and evaluates said match signal on the inverse of the second clock signal, said first latched signal being set equal to said match signal as latched by the timing of the inverse of second clock signal;

a feedback loop connecting said first latching mechanism to said second unit code counter; and a second latching mechanism having as inputs said first latched signal and the second clock signal and having as an output the synchronized output signal, wherein said second latching mechanism latches and evaluates said first latched signal on the second clock signal, the synchronized output signal being set equal to said first latched signal as evaluated by the timing of the inverse of second clock.

\* \* \* \* \*

UNITED STATES PATENT AND TRADEMARK OFFICE
CERTIFICATE OF CORRECTION

PATENT NO.    : 6,172,538 B1 Page 1 of 1
DATED         : January 9, 2001
INVENTOR(S)   : Pierre M. Selwan It is certified that error appears in the above-identified patent and that said Letters Patent is hereby corrected as shown below:

Column 5,
Line 53, replace "A look up may" with -- A look up table may --.

Signed and Sealed this

Tenth Day of May, 2005

JON W. DUDAS
*Director of the United States Patent and Trademark Office*